United States Patent
Criminisi et al.

(10) Patent No.: US 8,436,852 B2
(45) Date of Patent: May 7, 2013

(54) IMAGE EDITING CONSISTENT WITH SCENE GEOMETRY

(75) Inventors: Antonio Criminisi, Cambridge (GB); Carsten Rother, Cambridge (GB); Gavin Smyth, Huntingdon (GB); Amit Shesh, Minneapolis, MN (US)

(73) Assignee: Microsoft Corporation, Redmond, WA (US)

( * ) Notice: Subject to any disclaimer, the term of this patent is extended or adjusted under 35 U.S.C. 154(b) by 929 days.

(21) Appl. No.: 12/367,675

(22) Filed: Feb. 9, 2009

(65) Prior Publication Data

US 2010/0201681 A1    Aug. 12, 2010

(51) Int. Cl.
*G06T 15/00* (2011.01)
(52) U.S. Cl.
USPC ........... 345/419; 345/629; 345/632; 428/913; 428/914; 430/218; 707/517; 707/526
(58) Field of Classification Search .................. 345/419, 345/629, 632; 707/517, 526; 428/913, 914; 430/218
See application file for complete search history.

(56) References Cited

U.S. PATENT DOCUMENTS

| | | | |
|---|---|---|---|
| 6,466,205 B2 | 10/2002 | Simpson et al. | |
| 6,590,573 B1 | 7/2003 | Geshwind | |
| 2003/0025694 A1 | 2/2003 | Davis | |
| 2003/0038813 A1 | 2/2003 | Lu | |
| 2003/0038822 A1* | 2/2003 | Raskar | 345/632 |
| 2004/0104935 A1* | 6/2004 | Williamson et al. | 345/757 |
| 2005/0015005 A1* | 1/2005 | Kockro | 600/427 |
| 2005/0271273 A1 | 12/2005 | Blake et al. | |
| 2006/0132482 A1* | 6/2006 | Oh | 345/419 |
| 2007/0098290 A1 | 5/2007 | Wells | |
| 2011/0050685 A1 | 3/2011 | Yamada | |
| 2011/0261050 A1* | 10/2011 | Smolic et al. | 345/419 |

OTHER PUBLICATIONS

"3D: Out of Bounds action", retrieved on Dec. 26, 2008 at <<http://www.panosfx.com/index.php?option=com_content&task=view&id=107&Itemid=27>>, 3 pages.

Blinn, "Me and my (fake) shadow", IEEE Comput. Graph. Appl. 8, 1. 1988.

Cao, et al., "Single view compositing with shadows", retrieved on Dec. 26, 2008 at <<http://www.springerlink.com/content/t055g606n7023647/fulltext.pdf>>, Visual Comput (2005) 21: pp. 639-648.

(Continued)

*Primary Examiner* — Kimbinh T Nguyen
(74) *Attorney, Agent, or Firm* — Zete Law, P.L.L.C.; MacLane C. Key

(57) ABSTRACT

Image editing which is consistent with geometry of a scene depicted in the image is described. In an embodiment a graphical user interface (GUI) is provided to enable a user to simply and quickly specify four corners of a rectangular frame drawn onto a source image using the GUI. In embodiments, the four corners are used to compute parameters of a virtual camera assumed to capture the image of the drawn frame. Embodiments of an image processing system are described which use the virtual camera parameters to control editing of the source image in ways consistent with the 3D geometry of the scene depicted in that image. In some embodiments out of bounds images are formed and/or realistic-looking shadows are synthesized. In examples, users are able to edit images and the virtual camera parameters are dynamically recomputed and used to update the edited image.

20 Claims, 10 Drawing Sheets

OTHER PUBLICATIONS

Cavanagh, et al., "Shape From Shadows", Journal of Experimental Psychology: Human Perception and Performance 1989, vol. 15, No. 1, 3-27.

Cavanagh, "The artist as neuroscientist", Nature, vol. 434, Mar. 17, 2005, pp. 301-307.

Chuang, et al., "Animating Pictures with Stochastic Motion Textures", retrieved on Dec. 26, 2008 at <<http://delivery.acm.org/10.1145/1080000/1073273/p853-chuang.pdf?key1=1073273&key2=7711350321&coll=GUIDE&dl=GUIDE&CFID=16515927&CFTOKEN=81193244>>, Association for Computing Machinery, 2005, pp. 853-860.

Chuang, et al., "Shadow Matting and Compositing", retrieved on Dec. 26, 2008 at <<http://grail.cs.washington.edu/projects/digital-matting/papers/sig2003.pdf>>, 7 pages.

Criminisi, "Accurate Visual Metrology from Single and Multiple Uncalibrated Images", Springer Verlag, 2001.

Debevec, et al., "Modeling and Rendering Architecture from Photographs: A hybrid geometry-and image-based approach", retrieved on Dec. 26, 2008 at <<http://delivery.acm.org/10.1145/240000/237191/p11-debevec.pdf?key1=237191&key2=9141350321&coll=GUIDE&dl=GUIDE&CFID=15990308&CFTOKEN=64865770, ACM 1996, pp. 11-20.

DeCoro, et al., "Stylized Shadows", retrieved on Dec. 26, 2008 at <<http://www.cs.princeton.edu/gfx/pubs/DeCoro_2007_SS/styleshadows-small.pdf>>, Computer Graphics Laboratory, Princeton University, 8 pages.

Hartley, et al., "Multiple View Ge-ometry in Computer Vision" second edition, Cambridge University Press, ISBN: 0521540518, 2004.

Hoiem, et al., "Automatic Photo Pop-up", retrieved on Dec. 26, 2008 at <<http://delivery.acm.org/10.1145/1080000/1073232/p577-hoiem.pdf?key1=1073232&key2=4581350321&coll=GUIDE&dl=GUIDE&CFID=15990672&CFTOKEN=22588378>>, Robotics Institute, Carnegie Mellon University, Pittsburgh, PA., pp. 577-584.

Horry, et al., "Tour Into the Picture: Using a Spidery Mesh Interface to Make Animation from a Single Image", retrieved on Dec. 26, 2008 at <<http://delivery.acm.org/10.1145/260000/258854/p225-horry.pdf?key1=258854&key2=7891350321&coll=GUIDE&dl=GUIDE&CFID=15990764&CFTOKEN=57535778, Hitachi Ltd., 9 pages.

Igarashi, et al., "Teddy: A Sketching Interface for 3D Freeform Design", retrieved on Dec. 26, 2008 at <<http://delivery.acm.org/10.1145/1290000/1281532/a21-igarashi.pdf?key1=1281532&key2=6112350321&coll=GUIDE&dl=GUIDE&CFID=15990908&CFTOKEN=97701056>>, ACM SIGGRAPH 99, 8 pages.

Kersten, et al., "Illusory motion from shadows", Nature 379, 6560, 1996.

Lalonde, et al., "Photo Clip Art", retrieved on Dec. 26, 2008 at <<http://graphics.cs.cmu.edu/projects/photoclipart/>>, Carnegie Mellon Graphics and Micosoft Research, 4 pages.

Liebowitz, et al., "Creating architectural models from images", In Proc. Eurographics, 1999.

Lombaert, et al., "A Multilevel Banded Graph Cuts Method for Fast Image Segmentation", retrieved on Dec. 26, 2008 at <<http://ieeexplore.ieee.org/stamp/stamp.jsp?arnumber=1541265&isnumber=32910, Proceedings of the Tenth IEEE International Conference on Computer Vision (ICCV 2005), 7 pages.

Marr, "Vision: A computational investigation into the human representation and processing of visual information", W. H. Freeman, San Francisco, 1982.

Mohan, et al., "Editing Soft Shadows in a Digital Photograph", retrieved on Dec. 26, 2008 at <<http://ieeexplore.ieee.org/stamp/stamp.jsp?arnumber=4118490&isnumber=4118477>>, IEEE Computer Graphics and Application, 2007, pp. 23-31.

Moistner, "Using Photoshop to Make an Image Jump Out of Frame", retrieved on Dec. 26, 2008 at <<http://www.graphics.com/modules.php?name=Sections&op=viewarticle&artid=188>>, 5 pages.

Oh, et al., "Image-Based Modeling and Photo Editing", retrieved on Dec. 26, 2008 at <<http://groups.csail.mit.edu/graphics/ibedit/ibedit_s2001_cameraReady.pdf>, Laboratory for Computer Science, MIT, 10 pages.

"Out of Bounds (OOB)", retrieved on Dec. 26, 2008 at <<http://www.agaraga.com/photoshop_tutorials/oob/>>, 7 pages.

"Out of Bounds Tiger", retrieved on Dec. 26, 2008 at <<http://www.webdesign.org/web/photoshop/photo-editing/out-of-bounds-tiger.12332.html>> 6 pages.

"Out of Bounds—a walk through", retrieved on Dec. 26, 2008 at <<http://www.sandiegodslr.com/?q=node/140>>, 3 pages.

"Out-of-Bounds", retrieved on Dec. 26, 2008 at <<http://www.worth1000.com/tutorial.asp?sid=161043&page=7>>, 16 pages.

Petrovic, et al., "Shadows for Cel Animation", retrieved on Dec. 26, 2008 at <<http://www.cs.princeton.edu/gfx/proj/cel_shadows/petrovic2000.pdf>>, 6 pages.

Prasad, et al., "Single View Reconstruction of Curved Surfaces", retrieved on Dec. 26, 2008 at <<http://www.robots.ox.ac.uk/~mukta/cvpr06/1123_Prasad_M.pdf>>, 8 pages.

Rother, et al., "GrabCut—Interactive Foreground Extraction using Iterated Graph Cuts", retrieved on Dec. 26, 2008 at <<http://delivery.acm.org/10.1145/1020000/1015720/p309-rother.pdf?key1=1015720&key2=6863350321&coll=GUIDE&dl=GUIDE&CFID=16518105&CFTOKEN=84511647>>, Microsoft Research Cambridge, UK, ACM 2004, pp. 309-314.

Wu, et al., "Natural Shadow Matting", retrieved on Dec. 26, 2008 at <<http://delivery.acm.org/10.1145/1250000/1243982/a8-wu.pdf?key1=1243982&key2=7753350321&coll=GUIDE&dl=GUIDE&CFID=16518040&CFTOKEN=66960964.

Zeleznik, et al., "SKETCH: An Interface for Sketching 3D Scenes", retrieved on Dec. 26, 2008 at <<http://delivery.acm.org/10.1145/1290000/1281530/a19-zeleznik.pdf?key1=1281530&key2=5743350321&coll=GUIDE&dl=GUIDE&CFID=15992018&CFTOKEN=69290204>>, Brown University site of the NSF Science and Technology Center for Computer Graphics and Scientific Visualization, 6 pages.

* cited by examiner

IMAGE EDITING CONSISTENT WITH SCENE GEOMETRY

BACKGROUND

Image editing is required for many different applications such as adding 3D objects to an image such that they are consistent with the geometry depicted in the image, synthesizing realistic-looking shadows to be added to an image of a scene, creating so called "out of bounds images", manipulating images consistently with the 3D geometry of the scenes those images depict, and many other applications. Many previous approaches have attempted to reconstruct 3D geometry of a scene from single or multiple conventional images in order to provide such image editing solutions. However, reconstructing 3D geometry in this way is complex, time consuming and computationally expensive.

Out of bounds photography is an image editing technique for converting conventional digital photographs into compelling, depth-rich images. Many examples of out of bounds images are available today, for example, on the Internet. These may comprise, for example, an image of a child running into a paddling pool in a sunny garden. A rectangular picture frame is typically manually drawn onto the image using perspective so that the frame appears to extend through the plane of the photograph. For example, the frame is drawn around the paddling pool so that the child is partly inside and partly outside the frame. Because the frame is occluded by the child the impression of depth is enhanced. Also, the background region of the image, outside the frame and excluding the child, is typically manually replaced by a plain background. In addition, shadows may be manually added to the photograph to further enhance the impression of depth.

At present, photograph editing software may be used by skilled users to manually edit digital photographs in order to produce out of bounds effects. However, this is a difficult, time consuming and complex process. Many time consuming steps are typically required to be carried out in series. This means that it is difficult to modify an out of bounds image once it has been created, without starting again from scratch. Also, when users draw a frame onto a photograph the result is often unsatisfactory because the frame does not appear to be geometrically consistent with the scene depicted in the photograph. This is sometimes the case even for skilled artists and almost always a problem for novice users.

Existing methods for generating synthetic shadows typically involve reconstructing the complete 3D scene and then using ray-tracing to generate the shadow of interest. However, it is very complex and time consuming to carry out this process especially in the case of single images.

The embodiments described below are not limited to implementations which solve any or all of the disadvantages of known image processing systems for editing and/or manipulating images.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Image editing which is consistent with geometry of a scene depicted in the image is described. In an embodiment a graphical user interface (GUI) is provided to enable a user to simply and quickly specify four corners of a rectangular frame drawn onto a source image using the GUI. In embodiments, the four corners are used to compute parameters of a virtual camera assumed to capture the image of the drawn frame. Embodiments of an image processing system are described which use the virtual camera parameters to control editing of the source image in ways consistent with the 3D geometry of the scene depicted in that image. In some embodiments a software tool for enabling artists to compose out of bounds images is provided. Embodiments are also described in which realistic-looking shadows are synthesized as if cast by three dimensional objects depicted in the foreground of the source image. In examples, users are able to interactively edit images and the virtual camera parameters are dynamically recomputed and used to update the edited image to ensure consistency with the 3D scene it depicts.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in an image editing system for out of bounds photography, the system described is provided as an example and not a limitation. As those skilled in the art will appreciate, the present examples are suitable for application in a variety of different types of image processing systems.

As mentioned above, many previous approaches to image editing, manipulation and synthesis have dealt with the problem of reconstructing 3D geometry of a scene from single or multiple conventional images. This is time consuming, complex and computationally expensive. In embodiments described here, a new approach is taken in which, rather than striving for complete 3D reconstruction, a 2D method is used to ensure that an image is edited or manipulated in a manner consistent with the 3D geometry of the scene it depicts; without necessarily reconstructing the whole 3D scene. This is now explained in more detail with respect to FIG. 1.

Figure 1:
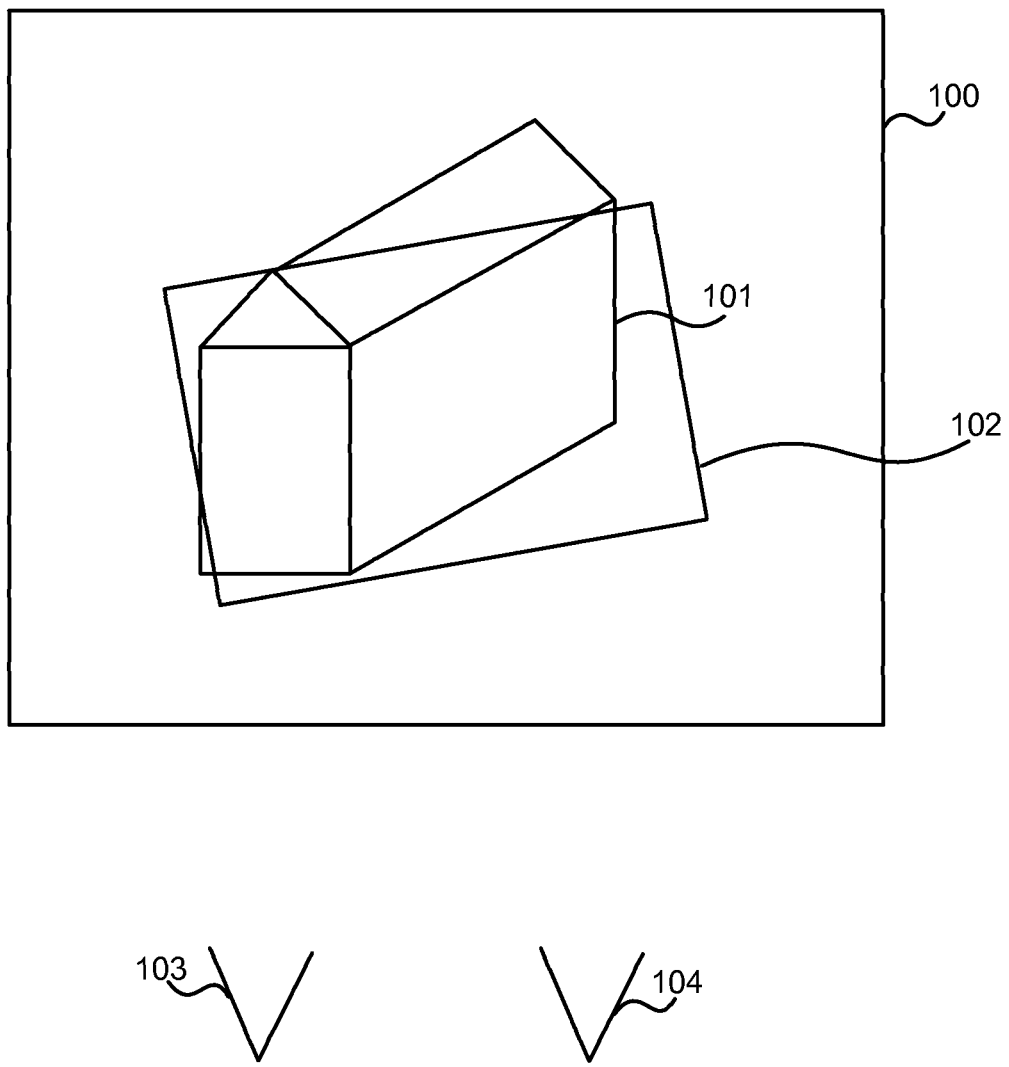
FIG. 1 is a schematic diagram of a scene of a building and a camera viewing that scene.

FIG. 1 shows an image 100 of a visual scene comprising a building 101 with a pitched roof. The scene is viewed by a camera 103 and the resulting image 100 is represented. Previous approaches to camera calibration have involved estimating the intrinsic and extrinsic geometric parameters of the actual camera 103 from image cues like parallelism and orthogonality. However, this is complex, time consuming and often impossible (from a single view). In embodiments described herein, a user provides hints. For example, the user specifies at least four points in the image, these points defining a quadrilateral frame which is assumed to be a rectangle or square. Information about this frame 102 is used to calculate intrinsic and extrinsic geometric parameters of a notional or virtual camera 104. This notional or virtual camera may be in a different location from the actual camera 103 and may have little in common with the actual camera 103 which captured the image 100. However, good results are achieved and in some cases, use of the virtual camera parameters is found to give improved out of bounds photography results as compared with using the actual camera parameters.

Figure 2:
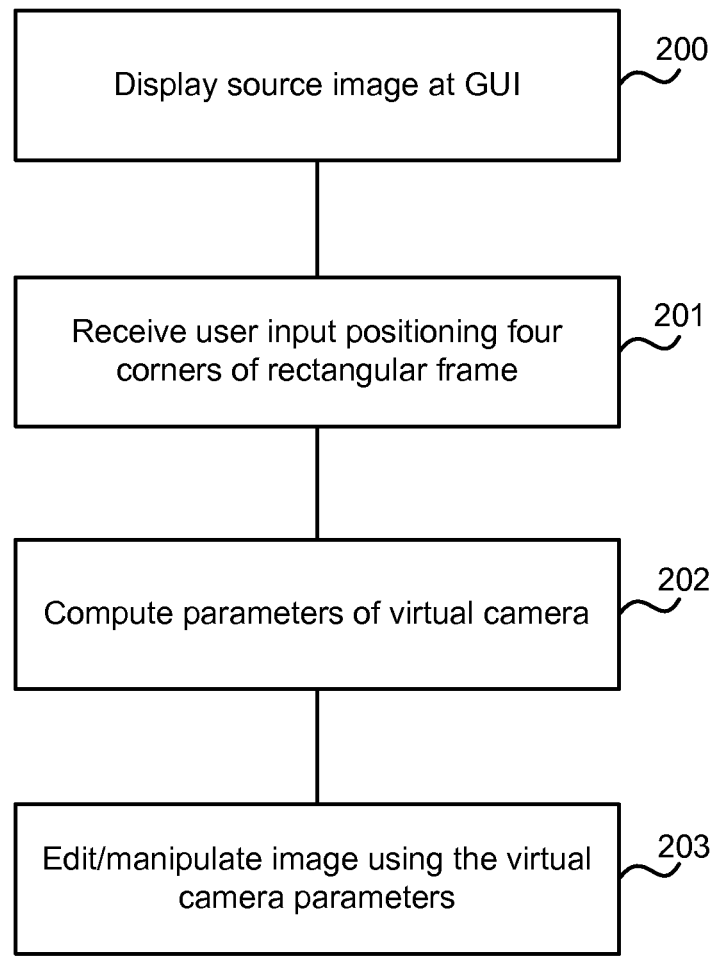
FIG. 2 is a flow diagram of a method of editing or manipulating an image in a manner consistent with the 3D geometry of the scene depicted in that image.

FIG. 2 is a flow diagram of a method of editing or manipulating a digital image in a way that is consistent with the 3D geometry of the scene captured in the image. For example, this method may be implemented at a computer using software. The source image is displayed at a graphical user interface 200 and user input is received 201 at that interface specifying the position in the image of at least four points at the corners of a frame. In some extreme cases two of the points may be superimposed although in most examples the corners are corners of a rectangular frame. The frame may be any polygon where at least some of the internal angles at the vertices may be assumed to be right angles. The user input is received in any suitable manner. For example, a default frame may be displayed on the source image and a user allowed to drag corners of this frame in order to adjust its size, shape and position. In other embodiments the user may type in co-ordinates for the points or speak those co-ordinates into a speech interface. The points may be removed from the display of the source image or may be retained.

The image editing system automatically computes 202 internal and external parameters of a virtual camera which is assumed to have captured the image of the drawn frame. This process is described in more detail below and comprises using the four points specified by the user at step 201. Once the virtual camera parameters are calculated the image editing system uses 203 those parameters during automated process for editing and/or manipulating the source image. It may also use the parameters to guide manual processes of editing and manipulating the source image. For example, the parameters may be used to ensure that an object added to the source image is positioned in a manner consistent with the geometry of the source image. Also, the parameters may be used to ensure consistency of synthesized shadows added to the source image. Many other examples are evident to the skilled person including manipulating moving images such as video.

Automatic computation of the virtual camera parameters is achieved as described herein in a fast and computationally practical manner. Minimal 3D information is extracted from the image in order to achieve this. This computation is incorporated into a flexible work-flow driven by an intuitive user interface. This enables rapid prototyping or designing of images by users of the image editing system. For example, a user is able to quickly create and experiment with many different variants of a particular image editing effect before deciding which one best expresses the user's intentions. With the resulting tool, untrained users can turn conventional photographs into compelling out of bounds images (or other types of image composition) while avoiding time-consuming pixel painting operations.

In an embodiment the image editing system provides a tool for creating out of bounds images. In this case the four points specified by the user are used to draw a frame onto the source image to create the out of bounds effect. The frame drawn onto the source image may be of any suitable closed shape such as a rectangle, ellipse, circle or square. The four points specified by the user are used to define a perimeter for that shape.

A rich 3D perception of the final composition is achieved by exploiting two strong cues—occlusions and shadows. A realistic-looking 3D frame is interactively inserted in the scene between segmented foreground objects and the background to generate novel occlusions and enhance the scene's perception of depth. This perception is further enhanced by adding new, realistic cast shadows.

In some embodiments the image editing system provides an option to use geometric cues about the scene depicted in the source image. These cues may be used to constrain positioning of the points specified by the user and hence the drawn frame in the case of out of bounds images. The geometric cues are of any suitable type. For example, these may comprise a horizon line which may be automatically computed by the system or may be input by a user. If the horizon line is input by a user the graphical user interface may provide a horizontal line over the source image which may be dragged into position by a user. In other examples the geometric cues may comprise lines in the image which are known to represent vertical lines such as edges of buildings. Further visual cues comprise texture gradient, shading and specularities.

Examples in which the image editing system is configured to create out of bounds images are now described. However, the image editing system may also be used for other applications in which 3D-aware image editing is required. As described with reference to FIG. 3 geometric cues about the scene depicted in the source image are obtained 300. The image processing system automatically repositions 301 the four points and the drawn frame (if applicable) to ensure consistency with the geometric cues. For example, in the case of the horizon line, the frame is constrained to have two of its sides intersect in a point on the horizon line. This corresponds to imposing that two sides of the frame are parallel to the ground. The virtual camera parameters are recomputed 302 using the new frame position and in some embodiments, such as the out of bounds photography embodiment, the frame is rendered on the source image 305. The user may provide a thickness 304 and a depth 303 for the frame in order that the frame may be represented as a 3D object and the frame may be shaded to further enhance the appearance of it being three dimensional. The remaining 12 corners of the frame are automatically computed in the image plane using the virtual camera parameters.

Using the virtual camera parameters and a light source position 306, which is a default value or a value entered by the user, the automated system computes 307 shadows cast by the frame as well as internal shadows of the frame. If the frame is repositioned by the user 308, for example, by clicking and dragging the frame at the graphical user interface, the virtual camera parameters are recomputed and the display updated accordingly. If the shadows are moved, for example, by the user dragging those on the graphical user interface, the light source position is updated to correspond with the new shadow location.

Figure 4:
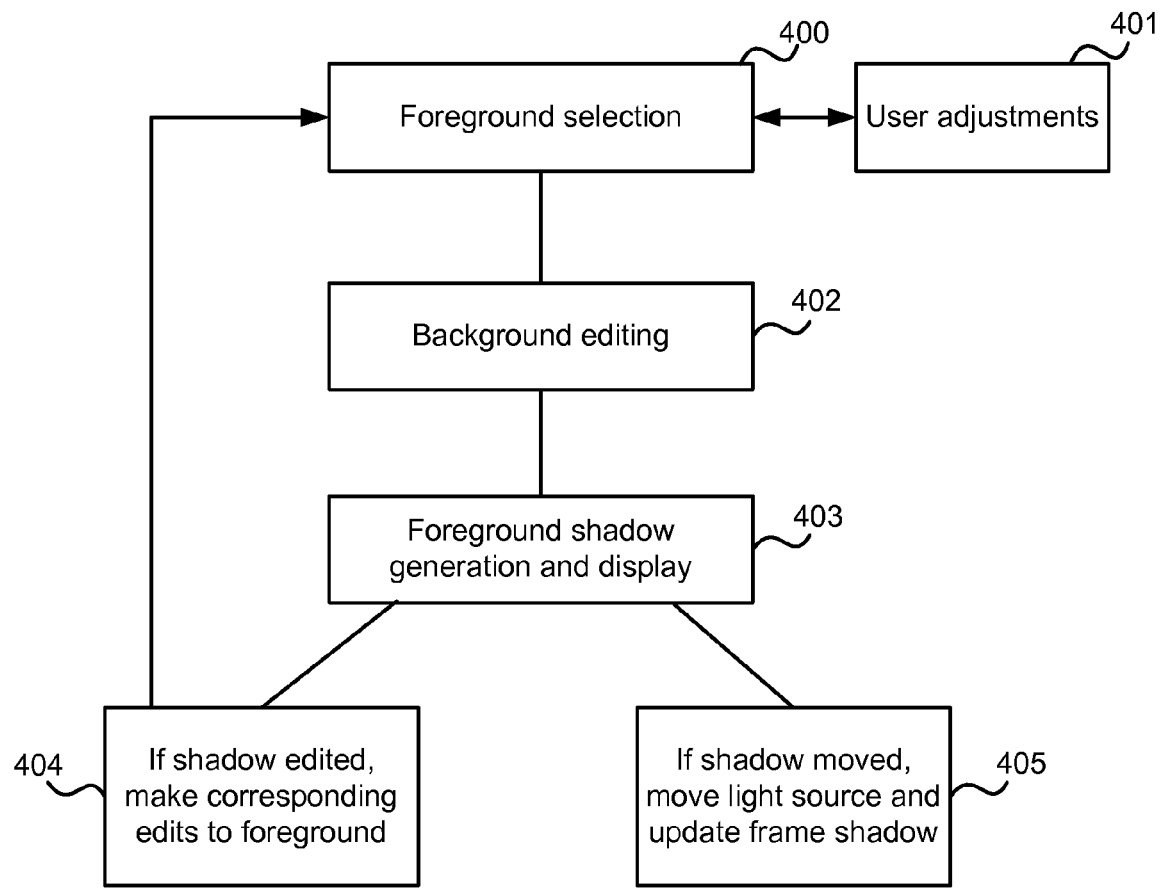
FIG. 4 is a flow diagram continuing the method of FIG. 4.

In embodiments in which out of bounds photographs are created, the image processing system proceeds to make a foreground selection 400. This may be achieved substantially automatically for example as described in US patent publication US 2005/0271273 "Foreground extraction using iterated graph cuts" which is incorporated herein in its entirety by reference. The foreground selection process results in a region of the source image comprising one or more objects being extracted from the source image. The remainder of the source image, referred to as the background, is either replaced by a plain image, is treated in some way (for example, frosted glass effect), or is replaced by a different image. This process of replacing or changing the background is referred to as background editing 402 in FIG. 4. The background editing process may be automated.

User adjustments 400 may be made to the foreground in any suitable manner and updates are automatically made to the rest of the out of bounds (or other image processing application) process. Once the foreground is available the system may automatically synthesize shadows cast by the foreground and render those on the display of the source image. More detail about the shadow generation process is given below.

Once the shadows are presented on the display a user is able to drag those to move them. In this case the light source position is adjusted 405 automatically to correspond with the new shadow position. In addition, the shadow cast by the frame (at step 307 of FIG. 3) may be recalculated. A user is also able to edit the shadow for example, by adding to or deleting parts of that shadow. In this case, corresponding edits 404 are made to the foreground. The shadows may also be edited in other ways, for example, by adjusting their opacity, level of blur and so on.

Figure 5:
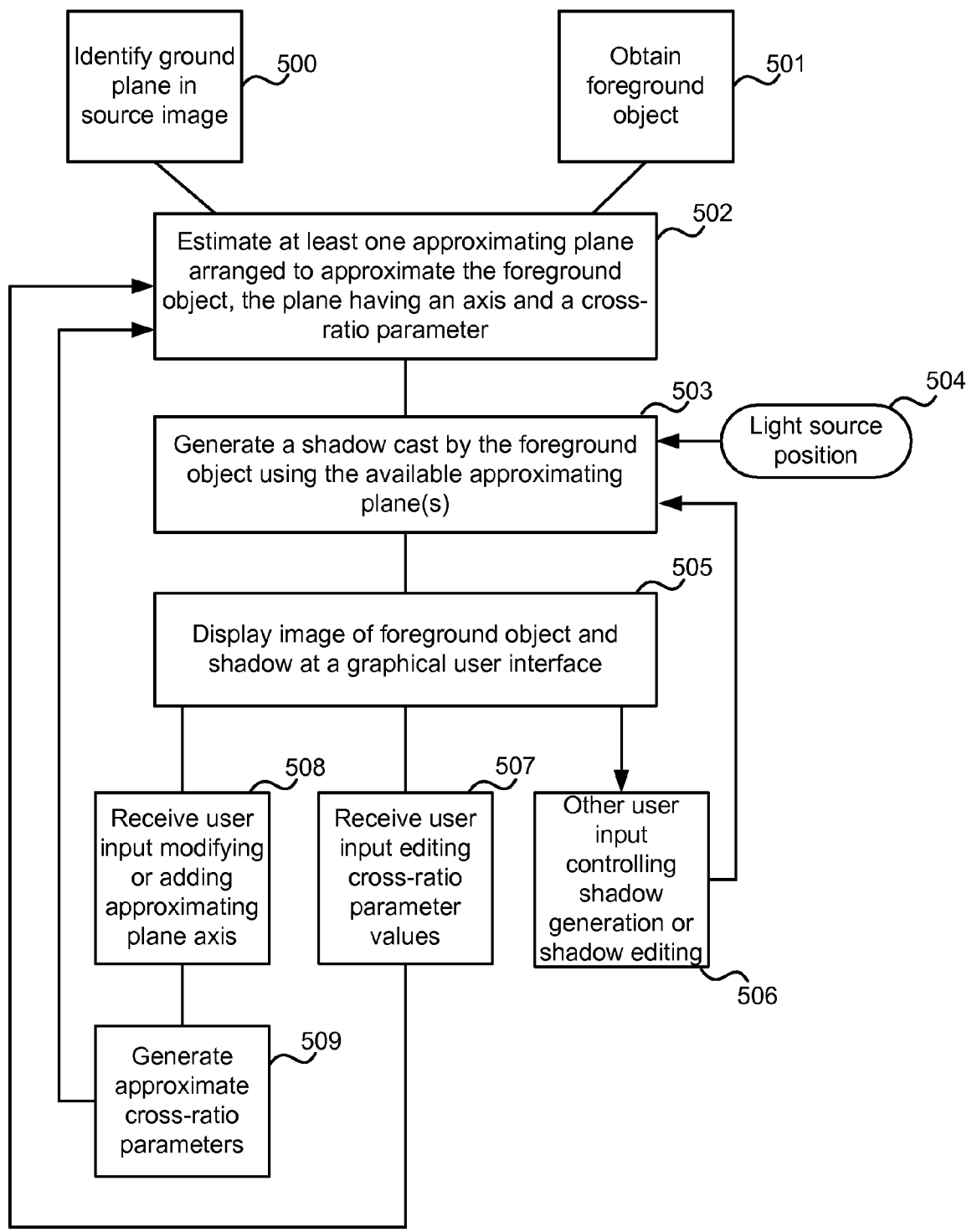
FIG. 5 is a flow diagram of a method of synthesizing and/or editing shadows in an image.

FIG. 5 is a flow diagram of a method of generating a realistic-looking shadow cast by the foreground object. The foreground object or region has already been obtained 501 for example, using the process at step 400 of FIG. 4, or in any other manner. A ground plane in the source image is also identified 500 using user input or an automated process.

At least one approximating plane is estimated 502 which is arranged to approximate the foreground object. The plane has an axis and a cross-ratio parameter. For example, the approximating plane may be modeled by a planar homology. A homology is the minimal model that provides the user with sufficient control to generate and manipulate the shadow of the planar object depicted at that plane of the foreground object. This is explained in more detail below.

A light source position 504 is known, for example, this is specified by the user, is set to a default value, or is estimated automatically from information in the source image. Using this light source position 504 together with the approximating plane estimated at step 502, the image processing system generates 503 a synthetic shadow as if cast by the foreground object. The synthesized shadow is displayed together with the foreground object at a graphical user interface 505 and the user is able to interactively edit the shadow in a variety of different ways.

In most cases, using a single approximating plane gives a realistic-looking shadow. However, for some complex objects such as a motor car, the synthesized shadow may be improved by using more than one approximating plane. The user interface may be arranged to enable a user to modify and/or add 508 approximating plane axes in a simple manner. For example, by dragging lines representing these axes. Appropriate cross-ratio parameters for the modified or added approximating planes are automatically generated 509 and the new approximating plane information is used to regenerate the shadow at step 503. It is also possible for the user interface to be arranged to enable the user to modify the cross-ratio parameter values 507. The generated shadow is dynamically updated according to any changes in the cross-ratio parameter values as indicated in FIG. 5.

Other user input 506 may be made at the user interface to control the shadow generation and also to enable editing of the shadows. For example, the user may adjust the degree of blur of the shadow and/or the opacity of the shadow.

Figure 6:
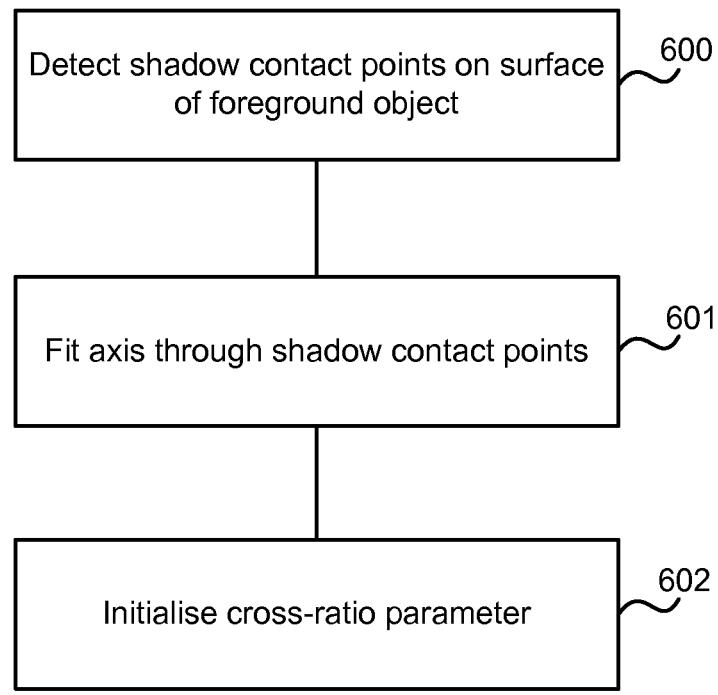
FIG. 6 is a flow diagram of a method of estimating an approximating plane.

More detail about an example process of estimating the approximating plane is now given with respect to FIG. 6. Shadow contact points on the surface of the foreground object are detected automatically 600. A shadow contact point is a type of ground contact point. A ground contact point is a 3D point on the foreground object's surface which touches the ground. A subset of these points are shadow contact points, where the light source transitions from being visible to non-visible. An axis is fitted 601 through these points 601 to provide the axis for the approximating plane. The cross-ratio parameter is also initialized 602 for the approximating plane.

Figure 7:
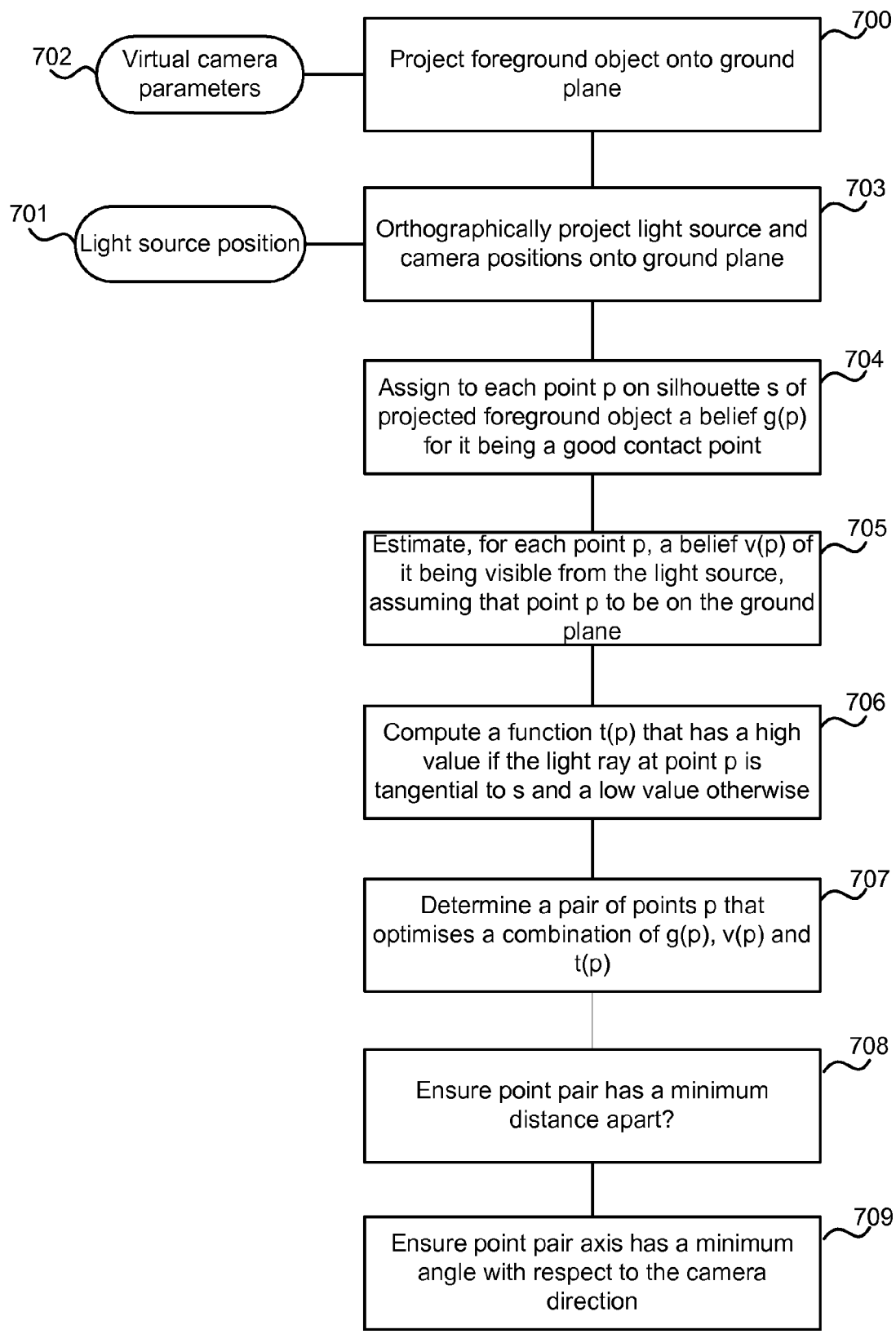
FIG. 7 is a flow diagram of a method of detecting shadow contact points.

More detail about an example method of detecting the shadow contact points is now given with respect to FIG. 7. The foreground object is projected 700 onto the ground plane using the virtual camera parameters 702 calculated using the method described above with respect to FIG. 2. The light source position 701 is accessed (from user input, or using a default value, or by automatically estimating this from the source image) and used to project 703 the light source and virtual camera position onto the ground plane.

A belief g(p) is assigned 704 to each point p on a silhouette S of the projected foreground object, that belief being for the point being a ground contact point. An estimate 705 is then made, for each point p, of a belief v(p) of that point being visible from the light source, assuming that point p to be on the ground plane. A function t(p) is computed 706 that has a high value if the light ray at point p is tangential to S and a low value otherwise. A pair of points is then determined 707 that optimizes a combination of g(p), v(p) and t(p). This point pair is forced 708 to be separated by a minimum distance. Also, an axis through the point pair is forced 709 to have a minimum angle with respect to the virtual camera direction.

More detail about computing the virtual camera parameters is now given.

In contrast to conventional approaches, only the drawn frame's front face (i.e. four corners) is used to estimate the camera parameters. However, the camera has more DOFs than the constraints provided by the imaged frame. Therefore, reasonable prior values are assigned to a number of geometric unknowns such as the pixel's aspect ratio and skew. A closed-form, real-time solution is provided for the remaining unknown camera parameters.

Assuming a conventional pinhole camera model, a world 3D point X is projected into the corresponding image point x as $$x \sim K[R|t]X \qquad (1)$$

where ~ indicates equality up to scale. The points x and X are represented by 3- and 4-vectors, respectively, in homogeneous coordinates. The 3×3 matrix R represents the camera rotation (3 DOFs). The 3-vector t represents the camera center, and the 3×3 matrix K represents the camera intrinsics.

Intrinsics: The matrix K is estimated. A model for K is:

$$K = \begin{pmatrix} f_x & \sigma & p_x \\ 0 & f_y & p_y \\ 0 & 0 & 1 \end{pmatrix} \quad (2)$$

The principal point $(p_x, p_y)^\tau$ is chosen to be the center of the image by default. Also, the camera CCD pixels are safely assumed to be square, i.e. $f_x = f_y = f$ with skew $\sigma=0$. This leaves the focal length f as the only remaining unknown. The assumption that the four corners of the frame's front face form a rectangle provides a quadratic constraint on f from which a closed form solution is computed.

Extrinsics: To determine the extrinsic parameters (rotation and translation) the frame is assumed to (a) lie on the Z=0 plane in the world coordinate system, and (b) form a parallelogram with unknown height h, length l and skew s. Selecting s as one additional unknown is chosen in order to guarantee a closed-form, consistent solution in 3D and yet give full freedom to the user to drag the 4 points independently. Formally, the four frame corners are.

$$X_1 \begin{pmatrix} 0 \\ 0 \\ 0 \\ 1 \end{pmatrix}, X_2 \begin{pmatrix} l \\ 0 \\ 0 \\ 1 \end{pmatrix}, X_3 \begin{pmatrix} l+s \\ h \\ 0 \\ 1 \end{pmatrix}, X_4 \begin{pmatrix} s \\ h \\ 0 \\ 1 \end{pmatrix}.$$

Consequently, the four frame sides are then uniquely defined as: $(x_1, x_2), (x_2, x_3), (x_3, x_4), (X_4, X_1)$. This provides a total of 9 unknowns: l,s,h,R (3 DOFs) and t (3 DOFs). Let $X_1, \ldots, X_4$ be the corresponding four points in the image. The 8 linearly independent equations provided by eqn. (1) suffice to solve for the 9 unknowns, since the overall scale can be set arbitrarily (e.g. by imposing the extra constraint $\|t\|^2=1$). A closed form solution for all camera parameters is obtained for any given set of four input image corners. This is true even for extreme cases like when two frame sides intersect each other in the image; in which case, one or more of the 3D corners lie behind the camera.

Note that computing the camera parameters from the drawn frame alone entails that the estimated camera may be different from the actual camera which captured the picture. This is in general not a problem and in fact may be exploited to advantage. For instance, the selected frame may yield a considerably shorter focal length than the true one and hence enhance perspective distortion and exaggerate the "pop-out" effect for out of bounds images. Finally, to add realism the frame faces may be shaded based on their normals.

Figure 3:
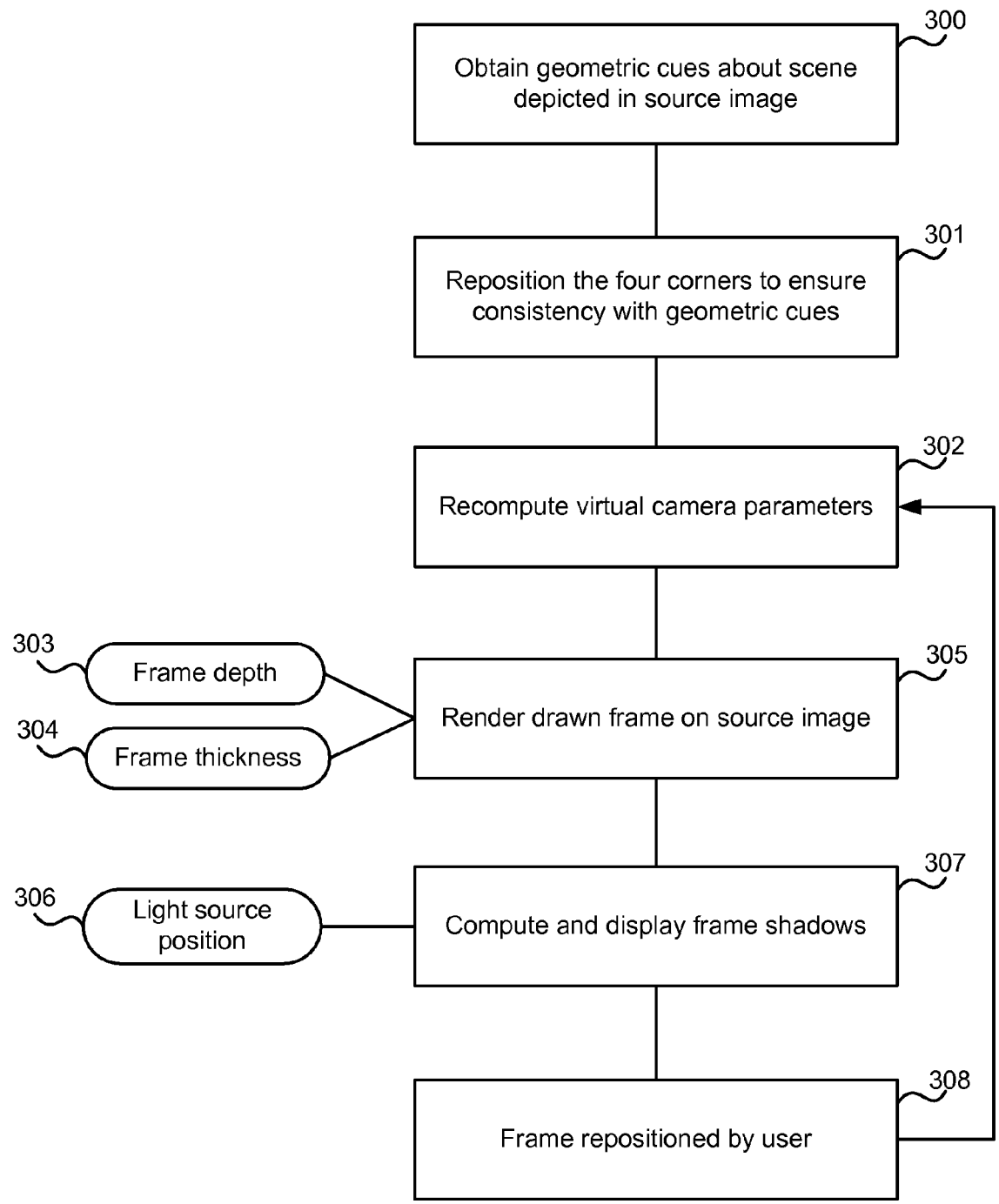
FIG. 3 is a flow diagram of part of a method at a computer system for generating an out of bounds image.

More detail about the use of geometric cues as described with reference to FIG. 3 above is now given.

If the vanishing line of the ground plane (the horizon line) is known (automatically computed or manually entered) then the frame can be constrained to have two of its sides intersect at a point on the vanishing line. This corresponds to imposing that two sides of the frame are parallel to the ground and helps ensure consistency with the scene geometry. Furthermore it is possible to force the bottom side of the frame to lie on the ground. To achieve this the normal to the ground plane is computed as follows. Given the horizon line l and the camera intrinsics K, the normal of the ground plane is uniquely defined as $n=K^T l$.

More detail about casting the foreground object's shadow as described with reference to FIGS. 5 to 7 is now given.

In the image plane, a mapping between points on an object and the corresponding shadow points can be compactly described by a planar homology as described in Criminisi, A, 2001, Accurate Visual Metrology from Single and Multiple Uncalibrated Images, Springer Verlag, which is incorporated herein by reference in its entirety. More formally, given the 2D image of an object point p (in homogeneous coordinates), the corresponding shadow point $p_s$ is given by $p_s = Hp$, with H a 3×3 matrix representing the homology transformation. A homology matrix H has 5 DOFs and can be parameterized by a vertex v, an axis a and a characteristic cross-ratio μ as:

$$H = I + \mu \frac{va^T}{v^T \cdot a} \quad (3)$$

Where I is the identity matrix. The vertex v is the image of the light source. The axis a is the image of the line intersection between the object's plane and the ground plane. The scalar parameter μ encapsulates all remaining 3D DOFs such as camera intrinsics, distance of the light source, etc. In fact, there are many camera/object geometric configurations which all produce the same 2D image. A homology represents the minima/model that provides the user with sufficient control to generate and manipulate the shadow of any planar object.

Each object is modelled with as few planes as possible. An approximating plane may pass through the middle of the 3D object and not correspond to any existing surface. The extracted 2D foreground (object mask) is split into a series of vertical strips in the image, each with its own homology. The bottom sides of these strips are their intersections with the ground, and thus define the series of axes of the respective homology matrices. The part of the object mask which is below an axis (under the ground) does not cast a shadow.

Estimating the homology axis. Given an unknown 3D object it is required to automatically estimate the optimal, single approximating plane; i.e. the plane which cuts through the object and minimizes depth error. This is a challenging task. However, a 3D plane which is parallel to the image plane is, in general, a good, conservative choice which yields reasonable shadows. A more important observation is the following: consider all 3D points of the object's surface which touch the ground. These are referred to herein as ground contact points. A subset of these points are shadow contact points. These are points where the light source transitions from being "visible" to "non-visible". Visibility of the light source from a 3D point means that the 3D segment connecting the light source and the point does not intersect the object. The shadow "starts" at these points to have the object appear "anchored" to the ground.

The most likely shadow contact points are detected and an axis fitted through them. The light may be assumed in a default position. An example process of detecting the ground contact points comprises projecting the foreground (also referred to as object mask) onto the ground, using the "roughly" calibrated geometry (i.e. the virtual camera parameters); orthographically projecting the light and the camera positions onto the ground, and assigning to each point p on the silhouette S of the projected object mask a belief g for it being a ground contact point, as follows:

$$g(p) = e^{\left(\frac{h_{(p)}-1}{0.2}\right)^2} \text{ with } h(p) = \frac{p_y - y_{min}}{y_{max} - y_{min}}$$

where $y_{max}, y_{min}$ are the vertical coordinates of the bounding box of S. The formula for g is based on the observation that as the viewing direction of the camera is typically not from the top, pixels towards the bottom are more likely on the ground. A belief v(p) is estimated, which is the belief for a point p∈S being visible from the light source, assuming it to be on the ground plane. The following equation is used: v(p)=1−g(q), where q is the first intersection point with S of the ray joining the light source and p (and v(p)=1 if p=q).

A function t(p) is computed that has a high value (1.0) if the light ray at point p is tangential to S, and a low value (e.g. 0.1) otherwise. (The object mask is first smoothed with a Gaussian (σ=3) to condition the tangent point detection algorithm).

A pair of points p(i∈1,2) is determined that maximizes $\pi_i g(p_i) v(p_i) t(p_i)$. The axis sought is the line passing through this pair. For stability the point pair is constrained to have a minimum distance (50% of the maximum distance of any two tangent points) and the axis to have a minimum angle (10°) with respect to the camera direction (in case no pair satisfies these constraints, an axis parallel to the image plane and through the optimal point p is chosen).

The process described above has been found to work well on many examples of up-right objects. The process may be extended to predicting multiple axes; however in embodiments described herein this choice is left to the user. In order to complete the homology estimation the scalar μ is also computed as now described.

Initialising μ. In the single plane (axis) case μ may be initialized by assuming the plane to be perpendicular to the ground. The axis is projected onto the ground plane. Then a new 3D point is computed by moving an arbitrary 3D point lying on the axis perpendicular to the ground. This new point and its shadow gives two linear constraints on H, sufficient to derive μ. If the result is unsatisfactory, the user is able to change the value of μ interactively.

Multiple planes. Although the axes for multiple planes are interactively selected, the corresponding p's may be computed automatically. The value of μ for the first plane is given as described earlier. Now, let p be the image of a 3D point which lies at the intersection of the first plane and its neighboring plane. As above, p and its shadow provide two linear constraints which suffice to obtain the value of μ of the neighboring plane. By repeating this operation for pairs of neighboring planes all values of μ are derived.

As with frame shadows, object shadows can be moved simply by a "click-and-drag" interface. Furthermore, the appearance of the shadow may be edited using a 2-brush interface (pen and erase). Typically, this step is used to remove minor inaccuracies in the shadow mask. Such edits are projected back onto (a copy) of the object mask (pre-homology warping).

This allows the shadow to be moved consistently after its mask has been manually edited. Such an operation would be very difficult to achieve with an explicit 3D reconstruction since the user may provide conflicting edits after moving the shadow. The homology-based approach described herein also allows the system to cast the object shadow onto the frame.

Other parameters like darkness, opacity, penumbra and gradient of the shadow may be interactively controlled to improve its appearance. These DOFs correspond to changing the area of the light source, strength of ambient (e.g. reflection from the sky) and indirect lighting. The shadow gradient is computed as a function of the distance from the object mask, modulated by the belief of an object mask point to be a ground contact point.

Figure 8:
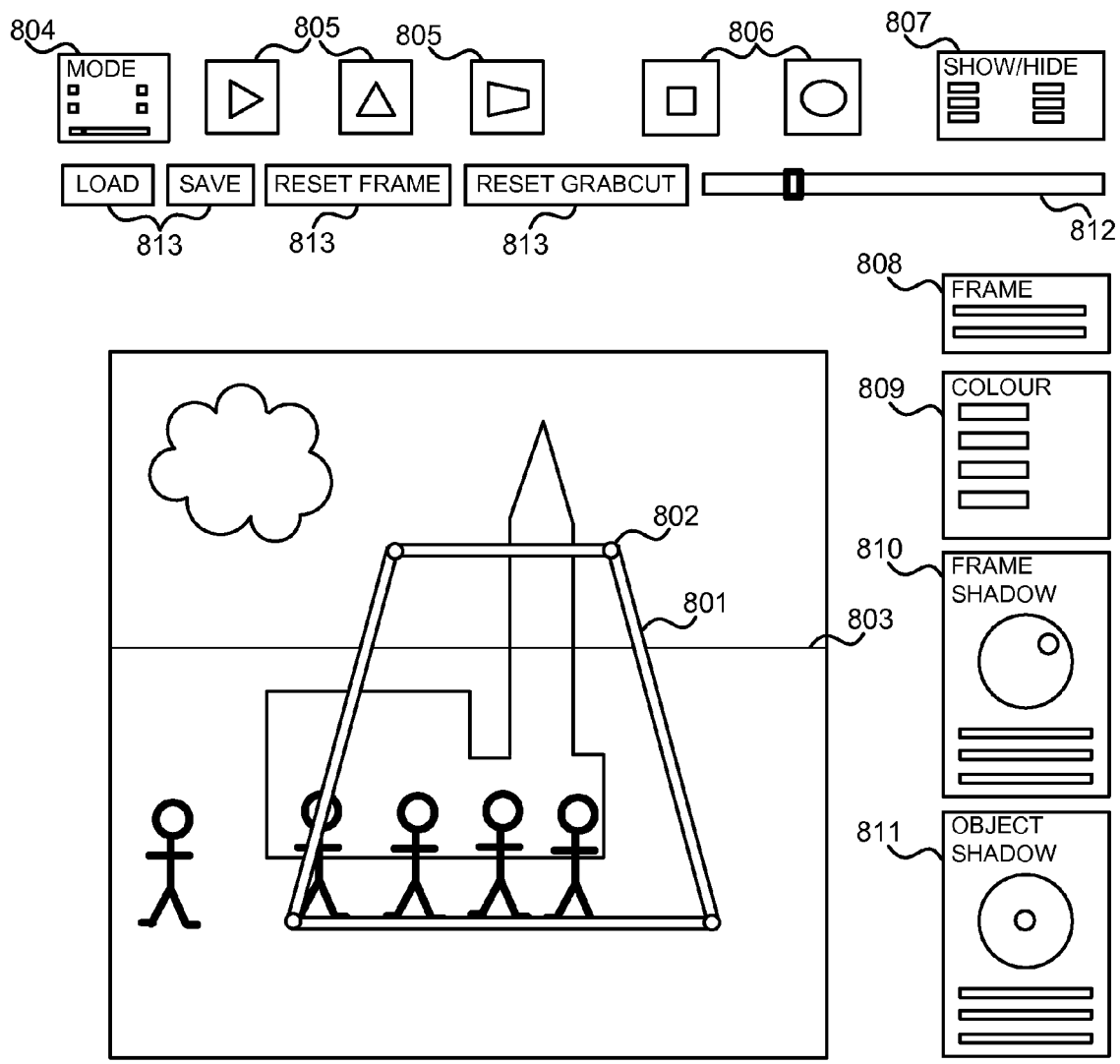
FIG. 8 is an example user interface display.
Figure 9:
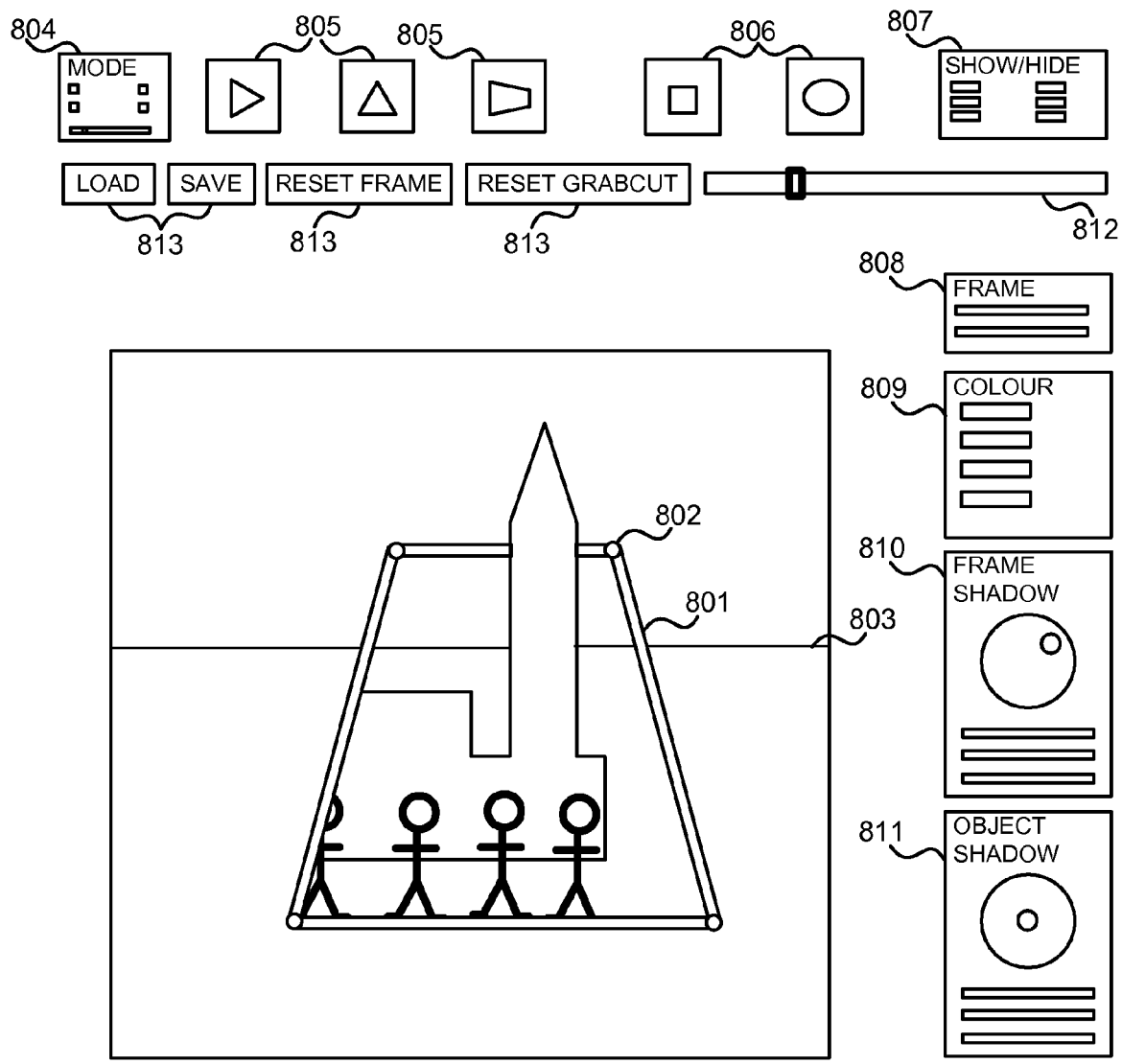
FIG. 9 is an example user interface display.

FIGS. 8 and 9 are example displays at a graphical user interface provided by an image editing system and arranged to enable a user to control 3D aware image editing, manipulation and processing using the image editing system.

A source image 800 is displayed depicting a 3D scene comprising a space rocket standing on the ground and people standing on the ground around the rocket viewing it. A rectangular frame 801 is drawn onto the image by the system and vertices 802 of the frame may be clicked and dragged by the user to reposition the frame. The frame may be used to create an out of bounds image or may be used for calibration purposes and then removed. A line 803 is provided which the user may drag into position to indicate the horizon line or which may be presented to indicate where the system has automatically determined the horizon line to be.

The graphical user interface comprises a mode section 804 with four buttons to enable a user to: drag the frame 801, drag a shadow cast by the foreground (not illustrated), carry out actions to the foreground; and carry out actions to the background. This mode section 804 also has a slider tool to control the width of a user interface brush tool for use in selecting areas of the source image 800.

A frame constraints section 805 controls whether geometric cues are to be used to constrain the frame position. This section provides three buttons, one for vertically oriented frames, one for horizontally oriented frames and one to specify that no geometric cues should be used to control the frame position. A shape section 806 has two buttons one to provide a rectangular (or square) frame and one to provide an elliptical frame to be added to the source image for creating out of bounds images. A show/hide section 807 enables the user to show or hide features such as: the background of the source image, strokes used in the foreground selection process, the frame shadow, the object shadow, the frame, the frame vertices.

A frame section 808 has slider controls for adjusting the thickness and depth of the frame. A color section 809 enables colors in different regions or areas of the image to be adjusted. A frame shadow section 810 and an object shadow section 811 are also provided. These have a circle representing a birds eye view of the source image and showing the position of the light source. The user is able to adjust the light source position by clicking and dragging the icon representing the light source. Slider controls are also provided to adjust the shadow tilt, offset, opacity and blur.

User interface buttons 813 are also provided to enable source images to be loaded, images to be saved and to reset the frame or the foreground selection process. A slider control 812 gives the ability to zoom the image 800.

FIG. 9 shows the source image of FIG. 8 once a foreground region comprising the rocket has been selected and the background replaced by a blank area.

Figure 10:
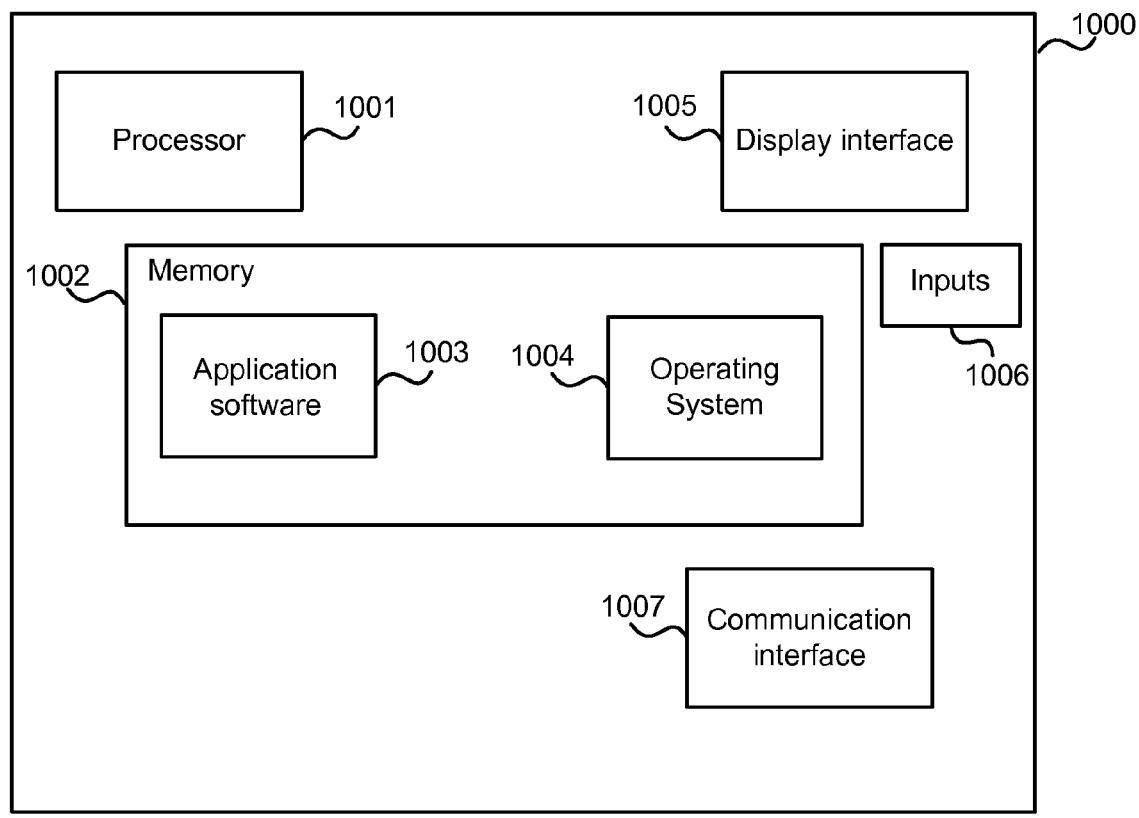
FIG. 10 illustrates an exemplary computing-based device in which embodiments of an image editing system may be implemented.

FIG. 10 illustrates various components of an exemplary computing-based device 1000 which may be implemented as any form of a computing and/or electronic device, and in which embodiments of an image editing system may be implemented.

The computing-based device 1000 comprises one or more inputs 1006 which are of any suitable type for receiving digital images, digital videos, media content, Internet Protocol (IP) input, files, or other input. The device also comprises communication interface 1007 which enables the device to connect to a communications network such as the Internet, a wireless network or any other communications network.

Computing-based device 1000 also comprises one or more processors 1001 which may be microprocessors, controllers or any other suitable type of processors for processing computing executable instructions to control the operation of the device in order to edit, manipulate or process digital images which may be static images or video. Platform software comprising an operating system 1004 or any other suitable platform software may be provided at the computing-based device to enable application software 1003 to be executed on the device.

The computer executable instructions may be provided using any computer-readable media, such as memory 1002. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 1005 may provide a graphical user interface, or other user interface of any suitable type.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of editing a source image, the method comprising:
   causing display of the source image at a graphical user interface;
   obtaining one or more geometric cues about a three-dimensional scene depicted in the source image, the one or more geometric cues being manually added from user input;
   receiving user input specifying at least four points in the source image;
   constraining the at least four points using the one or more geometric cues;
   determining parameters of a virtual camera based at least in part on the at least four points, the virtual camera being assumed to have captured another image defined by a frame on which the at least four points lie;
   editing the source image by using the parameters of the virtual camera to obtain an edited source image; and
   saving the edited source image at a memory.

2. A method as claimed in claim 1 wherein the source image depicts a three-dimensional scene and the editing the source image comprises editing in a way that is consistent with three-dimensional geometry of the three-dimensional scene.

3. A method as claimed in claim 1 wherein the determining the parameters of the virtual camera comprises determining a rectangle formed by the at least four points.

4. A method as claimed in claim 1 wherein the parameters of the virtual camera comprise intrinsic and extrinsic camera parameters.

5. A method as claimed in claim 1 which further comprises:
   displaying the edited source image at the graphical user interface;
   receiving user input modifying any of: the edited source image or the at least four points;
   re-computing the parameters of the virtual camera to ensure the parameters of the virtual camera are consistent with at least one of the edited source image or the at least four points after the modifying;

updating the edited source image using the recomputed parameters of the virtual camera; and updating the display of the edited source image.

6. A method as claimed in claim 1 wherein the one or more geometric cues comprise a horizon line in the source image which is determined using at least one of user input or automatic assessment of the source image.

7. A method as claimed in claim 1 wherein the editing the source image comprises adding the frame to the source image.

8. A method as claimed in claim 7 which further comprises accessing a depth and a thickness for the frame and adding the frame to the source image such that it is depicted as a three-dimensional frame.

9. A method as claimed in claim 7 wherein the editing the source image further comprises synthesizing a shadow cast by the frame using the parameters of the virtual camera and a light source position and adding the synthesized shadow to the source image.

10. A method as claimed in claim 1 wherein the editing the source image further comprises selecting a foreground region of the source image and modifying a remaining background region of the source image.

11. A method as claimed in claim 10 wherein the editing the source image further comprises synthesizing a shadow cast by objects depicted in the foreground region and adding the synthesized shadow to the source image.

12. A computer-implemented method of processing an image, the method comprising:
   accessing, by a processor, a foreground region of the image, the foreground region being a two-dimensional mask of a three-dimensional object;
   estimating, by a processor, at least one approximating plane to approximate the three-dimensional object, the at least one approximating plane having an axis and a cross-ratio parameter;
   generating, by a processor, a shadow cast by the three-dimensional object using the at least one approximating plane;
   displaying the image and the shadow at a graphical user interface; and
   receiving user input editing any of the axis or the cross-ratio parameter of the at least one approximating plane and updating the shadow accordingly.

13. A method as claimed in claim 12 which further comprises receiving user input adding another approximating plane and updating the shadow accordingly.

14. A method as claimed in claim 12 which further comprises specifying an homology for the at least one approximating plane, the homology being a transformation between points on the at least one approximating plane and corresponding points in the shadow.

15. A method as claimed in claim 12 wherein the estimating the at least one approximating plane comprises automatically detecting shadow contact points on a surface of the three-dimensional object and fitting an axis through the shadow contact points, the shadow contact points comprising points on the surface of the three-dimensional object that touch a horizon line in the image and where three-dimensional segments connecting a light source and the shadow contact points do not intersect the three-dimensional object.

16. An image processing apparatus comprising:
   a processor to provide a graphical user interface at a display;
   an output to display a source image at the graphical user interface, the source image depicting a three-dimensional scene;
   an input to receive user input at the graphical user interface specifying at least four points in the source image and one or more geometric cues about the three-dimensional scene;
   the processor being configured to access the one or more geometric cues and to constrain the at least four points using the one or more geometric cues;
   the processor being configured to determine parameters of a virtual camera based at least in part on the at least four points, the virtual camera being assumed to have captured another image defined by a frame on which the at least four points lie;
   the processor being configured to control editing of the source image to obtain an edited source image, the editing of the source image comprising using the parameters of the virtual camera as if they were parameters of an actual camera which captured the source image such that the editing is consistent with three-dimensional geometry of the three-dimensional scene; and
   a memory to save the edited source image.

17. An apparatus as claimed in claim 16 wherein the processor is further configured to determine the parameters of the virtual camera by determining a rectangle formed by the at least four points.

18. An apparatus as claimed in claim 16 wherein: the output is further configured to display the edited source image at the graphical user interface; the input being further configured to receive user input modifying any of: the edited source image or the at least four points; the processor being further configured to re-compute the parameters of the virtual camera to ensure the parameters of the virtual camera are consistent with the edited source image or the at least four points; and the processor being further configured to update the edited source image using the recomputed parameters of the virtual camera.

19. An apparatus as claimed in claim 16 wherein the processor is further configured to synthesize a shadow cast by the frame using the parameters of the virtual camera and a light source position and to add the synthesized shadow to the source image.

20. An apparatus as claimed in claim 19 wherein the processor is further configured to estimate at least one approximating plane used to synthesize the shadow by automatically detecting shadow contact points on a surface of the frame and fitting an axis through the shadow contact points, the shadow contact points comprising points on the surface of the frame which touch a horizon line in the image and where the light source position transitions from being visible to non-visible.

* * * * *